United States Patent [19]

Usui et al.

[11] Patent Number: 4,809,328

[45] Date of Patent: Feb. 28, 1989

[54] FM/FMX STEREOPHONIC RECEIVER

[75] Inventors: Noboru Usui; Kanji Tanaka, both of Oota; Ryuichi Ogawa, Gunma; Tsutomu Ishikawa, Oota; Kazuhisa Ishiguro; Masashi Arai, both of Gunma, all of Japan

[73] Assignee: Sanyo Electric Co., Ltd., Japan

[21] Appl. No.: 157,048

[22] Filed: Feb. 16, 1988

[30] Foreign Application Priority Data

Feb. 20, 1987 [JP] Japan ................. 62-38277
Feb. 20, 1987 [JP] Japan ................. 62-38280
Feb. 20, 1987 [JP] Japan ................. 62-38281

[51] Int. Cl.$^4$ .............................................. H04H 5/00
[52] U.S. Cl. ........................................ 381/13; 381/106
[58] Field of Search ................. 381/2, 3, 4, 5, 7, 10, 381/11, 13, 14

[56] References Cited

U.S. PATENT DOCUMENTS

| | | | |
|---|---|---|---|
| 4,674,122 | 6/1987 | Orban | 381/13 |
| 4,703,501 | 10/1987 | Sugai et al. | 381/13 |
| 4,704,727 | 11/1987 | Beard | 381/13 |
| 4,737,991 | 4/1988 | Sugai et al. | 381/13 |
| 4,751,734 | 6/1988 | Rucktenwald | 381/13 |
| 4,752,955 | 6/1988 | Torick | 381/13 |

Primary Examiner—Forester W. Isen
Attorney, Agent, or Firm—Darby & Darby

[57] ABSTRACT

An FM/FMX stereophonic receiver is capable of receiving an FM or an FMX stereophonic broadcast signal. The FM stereophonic broadcast signal includes a stereo sum signal and stereo difference signal, whereas the FMX stereophonic broadcast signal further includes a compressed stereo difference signal and an FMX ID signal indicating the FMX stereophonic broadcast signal. The FM/FMX stereophonic receiver has a stereo demodulator for receiving said broadcast signal and for producing left and right stereo signals, a detector for detecting the field strength of the receiving signal, and a noise reducer, which may be a circuit for changing the mode from stereophonic mode to monaural mode or a high cut circuit for attenuating the signals of high frequency region, for reducing noise signals contained in the left and right stereo signals. The FM/FMX stereophonic receiver further has a detector for detecting the FMX ID signal and a disabling circuit for disabling the noise reducer when the FMX ID signal is detected by the detector. Instead of the disabling circuit, a timing control circuit may be provided for changing the timing at which the noise reducer starts to activate in response to the detection of the FMX ID signal.

14 Claims, 6 Drawing Sheets

FM/FMX STEREOPHONIC RECEIVER

BACKGROUND OF THE INVENTION

1. Field of the Invention

The present invention relates to an FMX stereophonic receiver and, more particularly, to an FMX stereophonic receiver able to prevent deterioration of stereophonic channel separation caused by field strength variation.

2. Description of the Prior Art

FMX stereophonic broadcasting has been proposed as one means of enlarging the service area and improving the signal-to-noise ratio characteristics of FM stereo broadcasts. The transmission signal of the aforementioned FMX stereo broadcast includes a compressed stereo difference signal $(L-R)'$ broadcast simultaneously with the transmission signal of conventional FM stereo broadcasting, for example, a stereo sum signal $(L+R)$ and stereo difference signal $(L-R)$. The transmission signal can be expressed as:

$$f(t) = (L+R) + P\sin(w/2)t + (L-R)\sin wt + (L-R)'\cos wt \tag{1}$$

where $L+R$ is a stereo sum signal, $L-R$ is a stereo difference signal, $P$ is a stereo pilot signal, and $w$ is the subcarrier angular frequency. As shown by aforementioned Equation (1), compressed stereo difference signal $(L-R)'$ is quadrature modulated from uncompressed stereo difference signal $(L-R)$, resulting in an FMX stereo broadcast transmission signal spectrum shown in FIG. 1.

Furthermore, the relationship between the uncompressed stereo difference signal $(L-R)$ and the compressed stereo difference signal $(L-R)'$ is as shown in FIG. 2 which expresses the compression characteristics. In FIG. 2, when the input signal level is low, the aforementioned signal $(L-R)'$ is 20 dB greater than the uncompressed stereo difference signal $(L-R)$ and, at the same time, input/output characteristics become linear, and also the compression ratio becomes 1:1. When the level of the input signal is medium (approximately $-30$ dB), the compression ratio becomes $\infty:1$, and input/output characteristics are flat over a range of approximately 10 dB. When the input signal level becomes high, the aforementioned signal $(L-R)'$ rapidly attenuates. Therefore, compressed stereo difference signal $(L-R)'$ is as shown by solid line B in FIG. 2 with respect to stereo difference signal $(L-R)$ (solid line A), and the sum signal of the aforementioned signal $(L-R)$ and the aforementioned signal $(L-R)'$ is as shown by dotted line C in FIG. 2.

As discussed above, the transmission signal for FMX stereophonic broadcasting is received by a receiver as shown in FIG. 3. In FIG. 3, the FMX stereophonic broadcast transmission signal received by antenna 1 is received by a receiving circuit 2 of the same construction as a conventional FM stereophonic receiver in which stereo sum signal $(L+R)$ (hereafter referred to as M), stereo difference signal $(L-R)$ (hereafter referred to as S), and compressed stereo difference signal $(L-R)'$ (hereafter referred to as S') are each demodulated. When the received signal is detected by the FM detection circuit included in the receiving circuit, stereo sum signal M is demodulated. When the stereo composite signal is detected by the synchronous detection using the 38-kHz subcarrier signal obtained from the PLL in the receiving circuit, uncompressed stereo difference signal S is demodulated. And when the stereo composite signal is detected by the quadrature detection, compressed stereo difference signal S' is demodulated.

Uncompressed and compressed stereo difference signals S and S' obtained from receiving circuit 2 are added by adder 3, and the result is applied to VCA (voltage control amplifier) 4 operating as an attenuator. When stereo difference signal S and output signal (S+S') of VCA 4 are greater than a specified level (a knee-point level), first and second level detection circuits 5 and 6, each having a threshold level, operate in such a manner that the level of stereo difference signal S and the level of aforementioned output signal (S+S') of VCA 4 are respectively detected by first and second level detection circuits 5 and 6, and are compared by comparator circuit 7. Next, a signal according to the level difference obtained from aforementioned comparator circuit 7 is rectified and smoothed by rectifying circuit 8, and the rectified signal is applied to VCA 4 as a control signal. The output signal (S+S') of aforementioned VCA 4 is controlled by this control signal to be equal to the level of stereo difference signal S. However, when aforementioned stereo difference signal S and output signal (S+S') of VCA 4 are below the knee-point level, first and second level detection circuits 5 and 6 do not operate, and attenuation at VCA 4 is fixed at approximately 20 dB.

Although stereo sum signal M obtained from receiving circuit 2 is applied directly to matrix circuit 9, stereo difference signal S or output signal (S+S') of VCA 4 are selected by switch 10, and applied to matrix circuit 9. Although not given in the above description, a 10-Hz ID signal is included in the FMX stereophonic broadcast transmission signal, and FMX stereophonic broadcasts are differentiated from conventional FM stereophonic broadcasts by the aforementioned ID signal. In addition, because a detection circuit which detects the aforementioned ID signal is built in to receiving circuit 2, whether the broadcast is FMX stereo or not can be determined with the output signal of the aforementioned detection circuit. Switch 10 is controlled by the aforementioned ID signal. When the ID signal is present, switch 10 is switched to a position as shown in FIG. 3. Accordingly, stereo sum signal M and output signal (S+S') from level controlled VCA 4 are matrixed, and left and right stereo signals L and R are generated at left and right output terminals 11 and 12. Furthermore, when the ID signal is not present, switch 10 is switched to a position opposite to that shown in FIG. 3, and stereo sum signal M and stereo difference signal S are matrixed in matrix circuit 9.

As described above, because FMX stereophonic broadcast system uses compressed and expanded stereo difference signal S, it is possible to achieve significant improvements in the S/N ratio, and the service area can be enlarged comparably equal to that of the conventional monaural FM broadcast system.

It is to be noted that the FMX stereophonic broadcast transmission signal can be accurately received by a conventional FM stereophonic receiver. In this case, compressed stereo difference signal S' is quadrature modulated with respect to stereo difference signal S, and reception is not adversely affected.

Details concerning FMX stereophonic broadcasting are disclosed, for example, in an article "Improving the Signal-to-Noise Ratio and Coverage of FM Stereophonic Broadcasts" by Emil L. Torick and Thomas B.

Keller in "JOURNAL OF THE RADIO ENGINEERING SOCIETY", volume 33, number 12, issued December 1985.

A conventional FM stereophonic receiver is equipped with a separation control circuit to improve the signal-to-noise ratio during the receiving of signals having weak field strength. When the field strength of the receiving FM stereophonic signal drops below a predetermined level, the receiver is switched automatically and continuously from a stereophonic mode to a monaural mode by a stereophonic separation control circuit, because if the stereophonic mode were to be still maintained, there will be unpleasant noise signals in the stereophonic sounds. In other words, there is a lower limit of the field strength of the FM stereophonic signal at which the stereophonic mode is available (hereinafter referred to as a stereophonic mode holding lower limit). It has been found that the FM stereophonic mode holding lower limit is higher than the FMX stereophonic mode holding lower limit. For instance, according to one example, the FM stereophonic mode holding lower limit is about 40 dB, whereas the FMX stereophonic mode holding lower limit is about 20 dB.

This can be explained as follows. In the case of an FMX stereophonic broadcast system, the signal-to-noise ratio is improved through expansion and compression, such that the signal-to-noise ratio is approximately equal to that of monaural broadcast receiving. As a result, if a separation control circuit operates similarly to FM stereophonic broadcast receiving during FMX stereophonic broadcast receiving, deterioration of channel separation will become a greater problem than improvement of the signal-to-noise ratio. Nevertheless, it has been confirmed that if there is an extreme drop in the field strength of the receiving signal during FMX stereophonic broadcast receiving, there will be a corresponding severe drop in the signal-to-noise ratio.

SUMMARY OF THE INVENTION

The present invention has been developed with a view to substantially solving the above described problems and has for its essential object to provide an FM/FMX stereophonic receiver which can, while receiving the FM stereophonic signal, hold the stereophonic mode until the field strength of the receiving FM stereophonic signal is reduced to the FM stereophonic mode holding lower limit, and which can, while receiving the FMX stereophonic signal, hold the stereophonic mode continuously.

It is also an essential object of the present invention to provide an FM/FMX stereophonic receiver which can, while receiving the FM stereophonic signal, hold the stereophonic mode until the field strength of the receiving FM stereophonic signal is reduced to the FM stereophonic mode holding lower limit, and which can, while receiving the FMX stereophonic signal, hold the stereophonic mode until the field strength of the receiving FMX stereophonic signal is reduced to the FMX stereophonic mode holding lower limit.

It is also an essential object of the present invention to provide an FMX stereophonic receiver of the above described type which can be easily manufactured.

In accomplishing these and other objects, an FM and FMX stereophonic receiver according to the present invention comprises a stereo demodulator for receiving said broadcast signal and for producing left and right stereo signals, a detector for detecting the field strength of the receiving signal, and a noise reducer, which may be a circuit for changing the mode from stereophonic mode to monaural mode or a high cut circuit for attenuating the signals of high frequency region, for reducing noise signals contained in the left and right stereo signals. The FM/FMX sterepphonic receiver further comprises a detector for detecting the FMX ID signal and a disabling circuit for disabling the noise reducer when the FMX ID signal is detected by the detector. Instead of the disabling circuit, a timing control circuit may be provided for changing the timing at which the noise reducer starts to activate in response to the detection of the FMX ID signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE INVENTION

Figure 1:
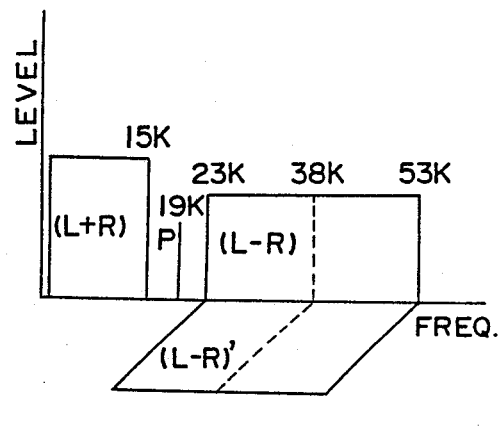
FIG. 1 is a graph showing an FMX stereo broadcast transmission signal spectrum.
Figure 2:
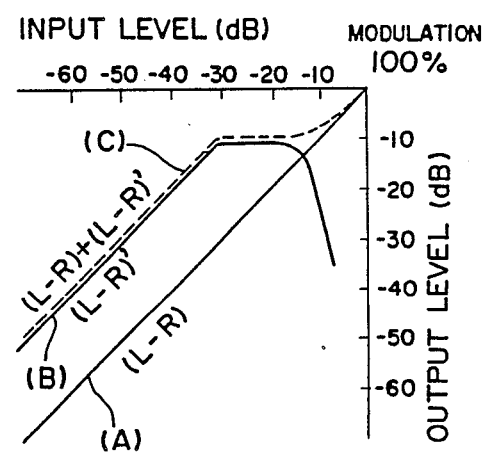
FIG. 2 is a graph showing input/output characteristics of stereo difference signals.
Figure 3:
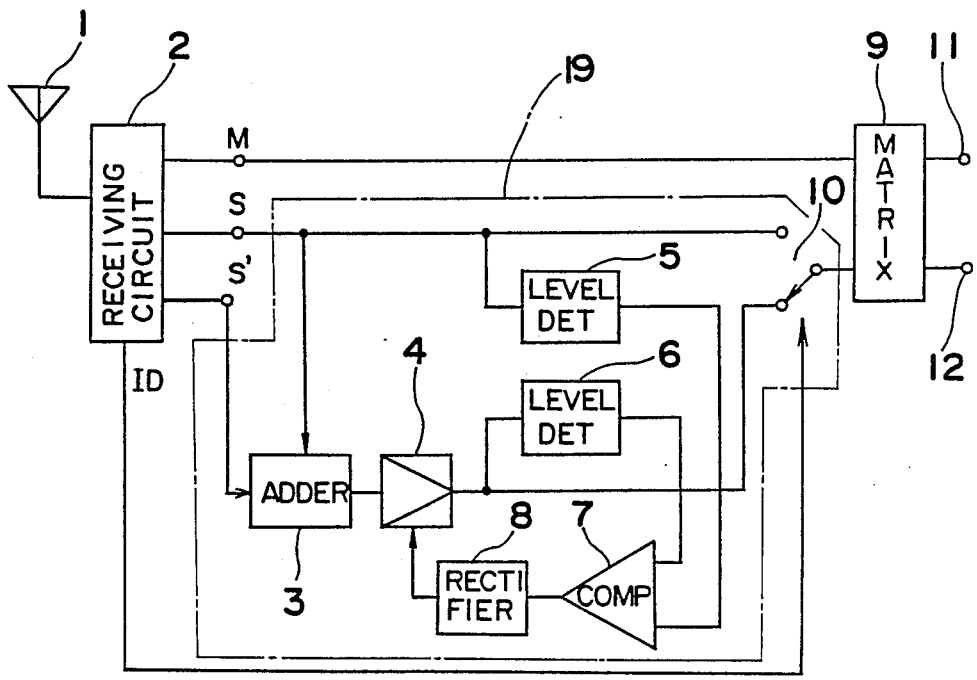
FIG. 3 is a circuit diagram of an FMX stereophonic receiver according to prior art.
Figure 4:
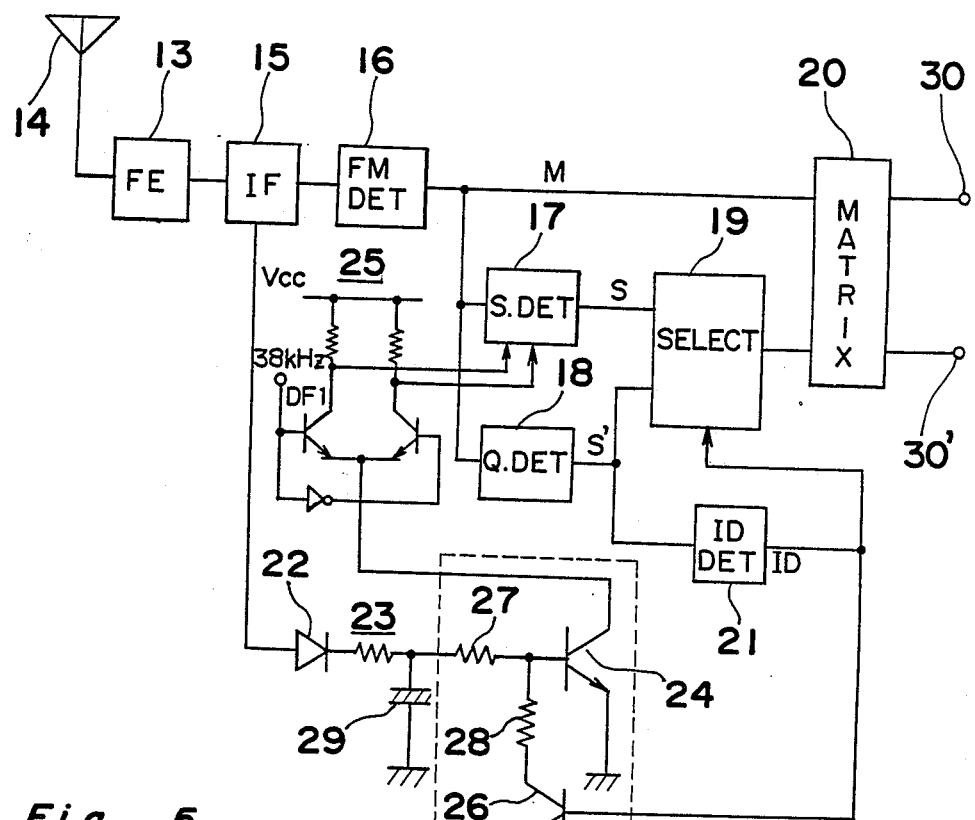
FIG. 4 is a circuit diagram of an FM/FMX stereophonic receiver according to a first embodiment of the present invention.

Referring to FIG. 4, an FM/FMX stereophonic receiver according to a first embodiment of the present invention is shown. In FIG. 4, reference number 13 indicates a front end in which a signal received by antenna 14 is converted to an IF signal. Reference number 15 is an IF amplifier which amplifies an IF signal. Reference number 16 is an FM detector, and reference number 17 is a synchronous detector which synchronously detects an uncompressed stereophonic difference signal S, which is included in the output signal (a composite signal) of the FM detector 16. Reference number 18 is a quadrature detector which synchronously detects compressed stereophonic difference signal S' included in the aforementioned composite signal. Reference number 19 is a selector which generates a level controlled signal (S+S') using uncompressed stereophonic difference signal S and compressed stereophonic difference signal S', and which selects uncompressed stereophonic difference signal S or the aforementioned signal (S+S'). Selector 19 corresponds to a circuit enclosed by a chain line shown in FIG. 3. Reference number 20 is a matrix circuit which matrixes-stereophonic sum signal M obtained from FM detector 16 with the output signal of selector 19. Reference number 21 is an ID detector which detects a 10-Hz ID signal included in the composite signal. Reference number 22 is a detection diode which detects the level of the IF signal obtained from IF amplifier 15; reference number 23 is a smoothing circuit which smooths the signal detected by the aforementioned detection diode 22; reference number 24 is an output transistor which operates according to the output DC signal of said smoothing circuit 23; and reference number 25 is a control circuit which includes a differential amplifier DF1 for amplifying a 38 kHz signal. By the control of the gain of differential amplifier DF1 as effected by the change of conductivity of output transistor 24, the level of the 38 kHz signal from control circuit 25 is changed so as to vary the demodulation efficiency of synchronous detector 17, and in turn, controlling stereophonic separation. Reference number 26 is a switching transistor which switches according to the output signal of aforementioned ID detector 21; Eo is a constant voltage source; and reference numbers 27 and 28 are potential resistors.

In operation, in a case where an FM stereophonic broadcast containing no 10-Hz ID signal is received, ID detector 21 produces a low level signal indicating that the ID signal is not present, and selector 19 thus selects uncompressed stereophonic difference signal S. As a result, stereophonic sum signal M and uncompressed stereophonic difference signal S are matrixed by matrix circuit 20, and left and right stereophonic signals L and R are applied to left and right output terminals 30 and 30', respectively. Furthermore, because the output of ID detector 21 is a low level signal, switching transistor 26 turns off, and output transistor 24 enters an active condition.

In this case, when the received FM stereophonic signal has a strong field strength, detection diode 22 produces a field strength signal having a relatively high level, and accordingly output transistor 24 produces a relatively high collector current. Thus, differential amplifier DF1 provided in control circuit 25 shows a high gain to provide a high level 38 kHz signal to synchronous detector 17. Accordingly, control circuit 25 does not operate to suppress the operation of synchronous detector 17, so that synchronous detector 17 produces a relatively high uncompressed stereophonic difference signal S.

On the contrary, when the received FM stereophonic signal becomes as weak as the FM stereophonic mode holding lower limit, such as below 40 dB, from the view point of filed strength, the field strength signal from detection diode 22 decreases to decrease the collector current of output transistor 24. When this happens, the differential amplifier provided in control circuit 25 shows a low gain to provide a low level 38 kHz signal to synchronous detector 17. Accordingly, control circuit 25 operates to start suppressing the operation of synchronous detector 17, thus reducing the demodulation efficiency of synchronous detector 17, and resulting in the reduction of the level of uncompressed stereophonic difference signal S. As a result, stereophonic separation when the signals are matrixed drops, and the signal-to-noise ratio improves. Because separation continuously varies with the collector current of output transistor 24, specifically according to the strength of the received signal, there is a natural improvement in the signal-to-noise ratio.

Next, in a case where an FMX stereophonic signal is received, ID detector 21 produces a high level output signal upon detection of the ID signal, so that selector 19 selects signal (S+S') and switching transistor 26 turns on. Because aforementioned switching transistor 26 turns on by the high level signal from ID detector 21, a high level signal from constant voltage source Eo is applied to the base of transistor 24. Thus, output transistor 24 is turned on regardless of whatever signal applied thereto from diode 22. As a result, the differential amplifier in control circuit 25 always shows a high gain to always produce a high level 38 kHz signal. When this condition takes place, level suppression of signal (S+S') will not be carried out irrespective of the strength of the received FMX stereophonic signal. Thus, the FMX stereophonic signals, which intrinsically have a good signal-to-noise ratio characteristics, can therefore be received without inducing the deterioration of channel separation.

Figure 5:
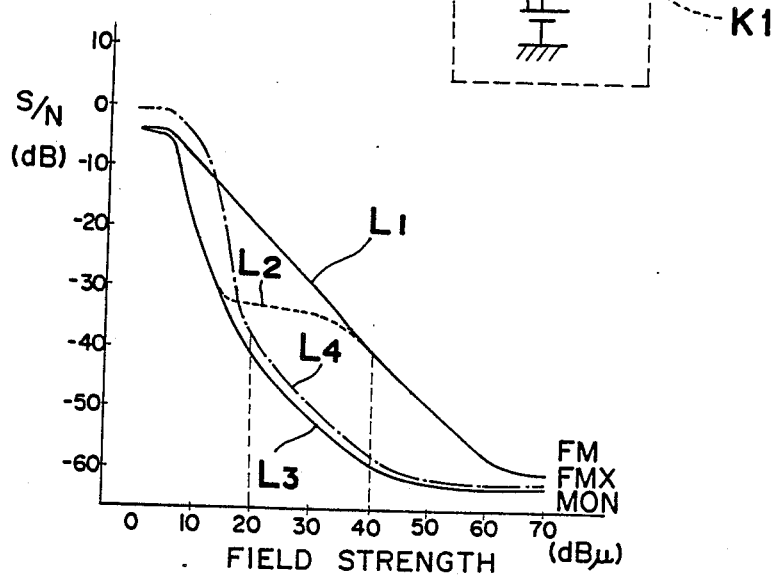
FIG. 5 is a graph showing a relationship between the field strength of the receiving signal and the signal-to-noise ratio for FM stereophonic signal, FMX stereophonic signal and monaural signal, and also showing a mode change effected by the circuit of FIG. 4.

Referring to FIG. 5, the signal-to-noise ratio characteristics of FM and FMX stereophonic broadcasts ar shown. In FIG. 5, solid line L1 shows the relationship between field strength and signal-to-noise ratio during FM stereophonic signal receiving, dot-dash line L4 shows the same relationship but during FMX stereophonic signal receiving, and solid line L3 also shows the same relationship but during monaural signal receiving. It is empirically known that the stereophonic separation will become poor when the signal-to-noise ratio becomes greater than approximately −40 dB. In the case where the FM stereophonic signal is receiving, the signal-to-noise ratio will be reduced to −40 dB when the field strength of the received FM stereophonic signal drops below approximately 40 dB. This level is referred to as an FM stereophonic mode holding lower limit, because when the receiving FM stereophonic signal becomes lower than this limit, the mode should be changed to monaural mode to improve the signal-to-noise ratio. However, in the case when the FMX stereophonic signal is receiving, the signal-to-noise ratio will be reduced to −40 dB when the field strength of the received FMX stereophonic signal drops below approximately 20 dB.

Therefore, by the circuit of FIG. 4, during the receiving of FM stereophonic signal, the field strength signal as detected by detection diode 22 changes the conductivity of transistor 24 to operate the control circuit 25 to suppress the operation of synchronous detector 17, which eventually controls the stereophonic separation. More specifically, by the circuit of FIG. 4, when the field strength of the receiving FM stereophonic signal becomes weak, such as below 40 dB, the field strength signal from detection diode 22 will be reduced to level which will reduce the conductivity of transistor 24. Thus, the gain of the differential amplifier in control circuit 25 will be reduced to reduce the 38 kHz signal level, resulting in poor stereophonic separation.

Therefore, during the FM stereophonic signal receiving, control circuit 25 automatically changes the mode from stereophonic mode to monaural mode along a dotted line L2 in accordance with the change of conductivity of transistor 24.

On the contrary, by the circuit of FIG. 4, during the receiving of FMX stereophonic signal, transistor 24 is always maintained to a high conductive condition, even when the FMX stereophonic signal becomes weak. Thus, the gain of the differential amplifier in control circuit 25 will be maintained to a high level produce the 38 kHz signal having a high level, resulting in good stereophonic separation. In the first embodiment, during the FMX stereophonic signal receiving, the mode is not automatically changed from the stereophonic mode to the monaural mode even when the receiving FMX stereophonic signal becomes lower than the FMX stereophonic mode holding lower limit. This is because the signal-to-noise ratio of the FMX stereophonic signal is quite similar to that of the monaural signal.

As is clear from the graph shown in FIG. 5, since the signal-to-noise ratios of monaural and FMX stereophonic signal receiving are approximately equal even when the signal is weaker than 40 dB, the signal-to-noise ratio will be more favorable than that of FM signal receiving. Therefore, according to the preferred embodiment shown in FIG. 4, even if stereophonic separation control is not applied during FMX stereophonic signal receiving, receiving with a good signal-to-noise ratio can be maintained.

Note that regarding the first embodiment shown in FIG. 4, a selector switch is inserted between the base of output transistor 24 and the ground, but that switching of stereophonic separation control can also be achieved by turning the control circuit itself on and off. In addition, while in the preferred embodiment, stereophonic separation is controlled by controlling the demodulation efficiency of synchronous detector 17, the present invention also applies to other separation control methods, including mixing left and right stereophonic signals L and R obtained at left and right output terminals 30 and 30'. Moreover, in a preferred embodiment, FMX stereophonic signal receiving is determined by detecting the presence of an ID signal, but the aforementioned determination can also be accomplished by detecting the output level of quadrature detector 18.

According to a first embodiment of the present invention, an FMX stereophonic receiver which is able to receive both FM stereophonic signals and FMX stereophonic signals with a good signal-to-noise ratio can be provided. In particular, an FMX stereophonic receiver with both good signal-to-noise ratio and stereophonic separation characteristics can be provided because control of stereophonic separation is inactivated during FMX stereophonic signal receiving.

Figure 6:
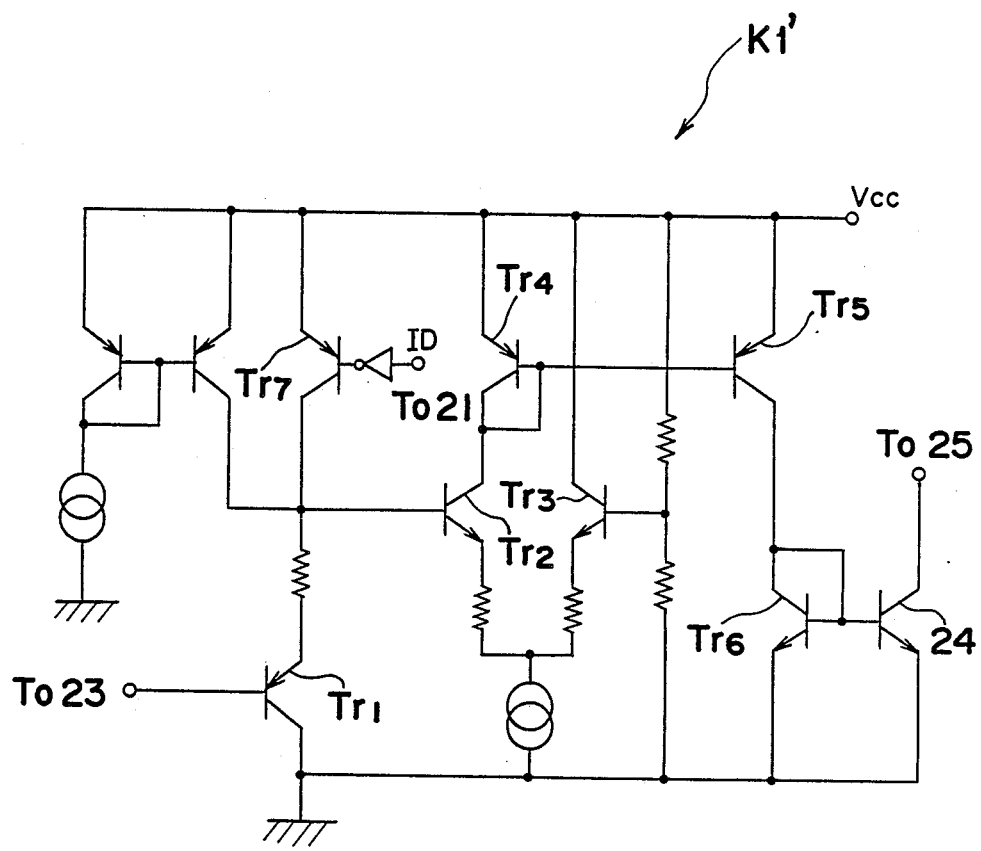
FIG. 6 is a detailed circuit diagram of a portion enclosed by a dotted line in FIG. 4.

Referring to FIG. 6 a circuit K1' is shown which can be replaced with a circuit K1 enclosed in a dotted line in FIG. 4.

During the receiving of FM stereophonic signal, transistor Tr7 is turned off by the low level signal produced from ID detector 21. Thus, the base of transistor Tr2 is disconnected from a voltage source Vcc. When detection diode 22 produces a high level signal indicating the strong field strength, smoothing circuit 23 produces a high level signal which is applied to the base of transistor Tr1. Thus, transistor Tr1 is turned off, and a current from a constant current source is provided to transistor Tr2. The collector current of transistor Tr2 causes current flow through transistors Tr4, Tr5 and Tr6, thereby conducting transistor 24. On the contrary, when the detection diode 22 produces a low level signal indicating the weak field strength, transistor Tr1 is turned on. Thus, results in the tun off of transistor 24.

During the receiving of FMX stereophonic signal, transistor Tr7 is turned on by the high level signal produced from ID detector 21. Thus, transistor Tr2 turns on to turn on transistor 24 regardless of on and off states of transistor Tr1. Thus, the FMX stereophonic mode is maintained.

Figure 7:
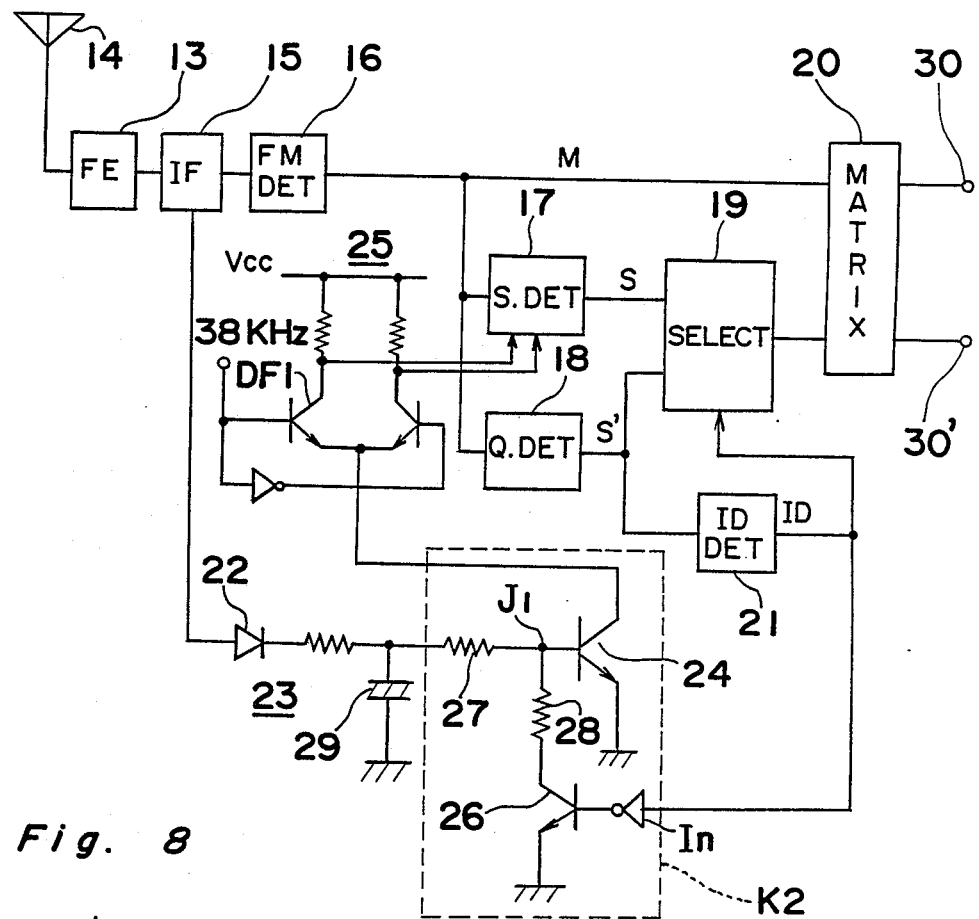
FIG. 7 is a circuit diagram of an FM/FMX stereophonic receiver according to a second embodiment of the present invention.

Referring to FIG. 7, a second embodiment of the present invention is shown. When compared with the first embodiment shown in FIG. 4, the second embodiment further has an inverter In connected between ID detector 21 and switching transistor 26. Also, in the second embodiment, constant voltage source Eo is eliminated.

Figure 8:
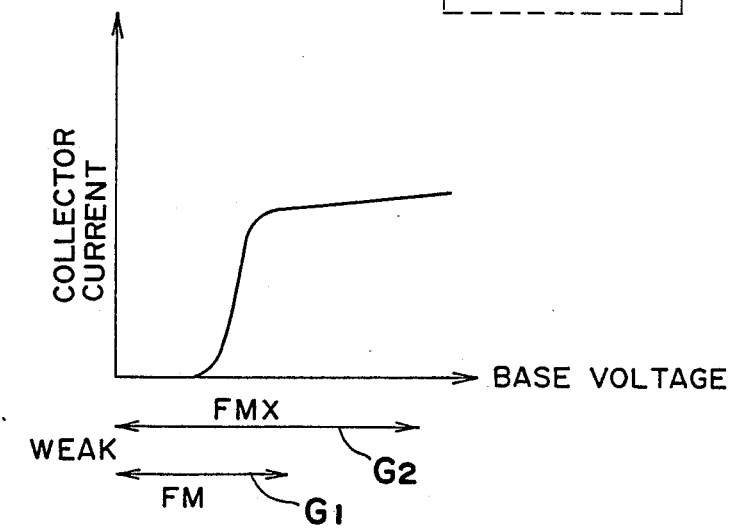
FIG. 8 is a graph showing a base voltage and collector current characteristic of a transistor employed in the circuit of FIG. 7.

In operation, when the FM stereophonic broadcast signal is being received, the 10-Hz ID signal is not present. Thus, ID detector 21 produces a low level signal which is applied to selector 19 and also to inverter In. Thus, switching transistor 26 turns on to connect resistor 28 between junction J1 and ground. Accordingly, the voltage across capacitor 29 is divided by resistors 27 and 28, and the divided voltage as produced at junction J1 is applied to the base of output transistor 24. Therefore, with respect to the change of FM stereophonic signal between weak and strong within a certain range, the voltage at junction J1 applied to the base of transistor 24 varies within a relatively narrow range G1, as shown in FIG. 8. In FIG. 8, the base voltage and collector current characteristic of transistor 24 is also shown. Thus, during the FM stereophonic signal receiving, the conductivity, i.e., the collector current, of transistor 24 starts to be reduced when the FM stereophonic signal is reduced from a relatively high level, i.e., FM stereophonic mode holding lower limit, such as 40 dB.

When an FMX stereophonic signal is received, ID detector 21 produces a high level signal so that selector 19 selects signal (S+S') and switching transistor 26 turns off. Accordingly, the voltage across capacitor is applied through resistor 27 to the base of transistor 24 without being divided. Therefore, with respect to the change of FMX stereophonic signal between weak and strong in the same range as that of the FM stereophonic signal, the voltage at junction J1 applied to the base of transistor 24 varies within a relatively wide range G2, as shown in FIG. 8. Thus, during the FMX stereophonic signal receiving, the conductivity of transistor 24 starts to be reduced not until the FMX stereophonic signal is reduced to a relatively weak level, i.e., FMX stereophonic mode holding lower limit, such as 20 dB. When the receiving FMX stereophonic signal becomes lower than this limit, the mode is changed from the stereophonic mode to monaural mode to improve the signal-to-noise ratio.

Figures 9, 10:
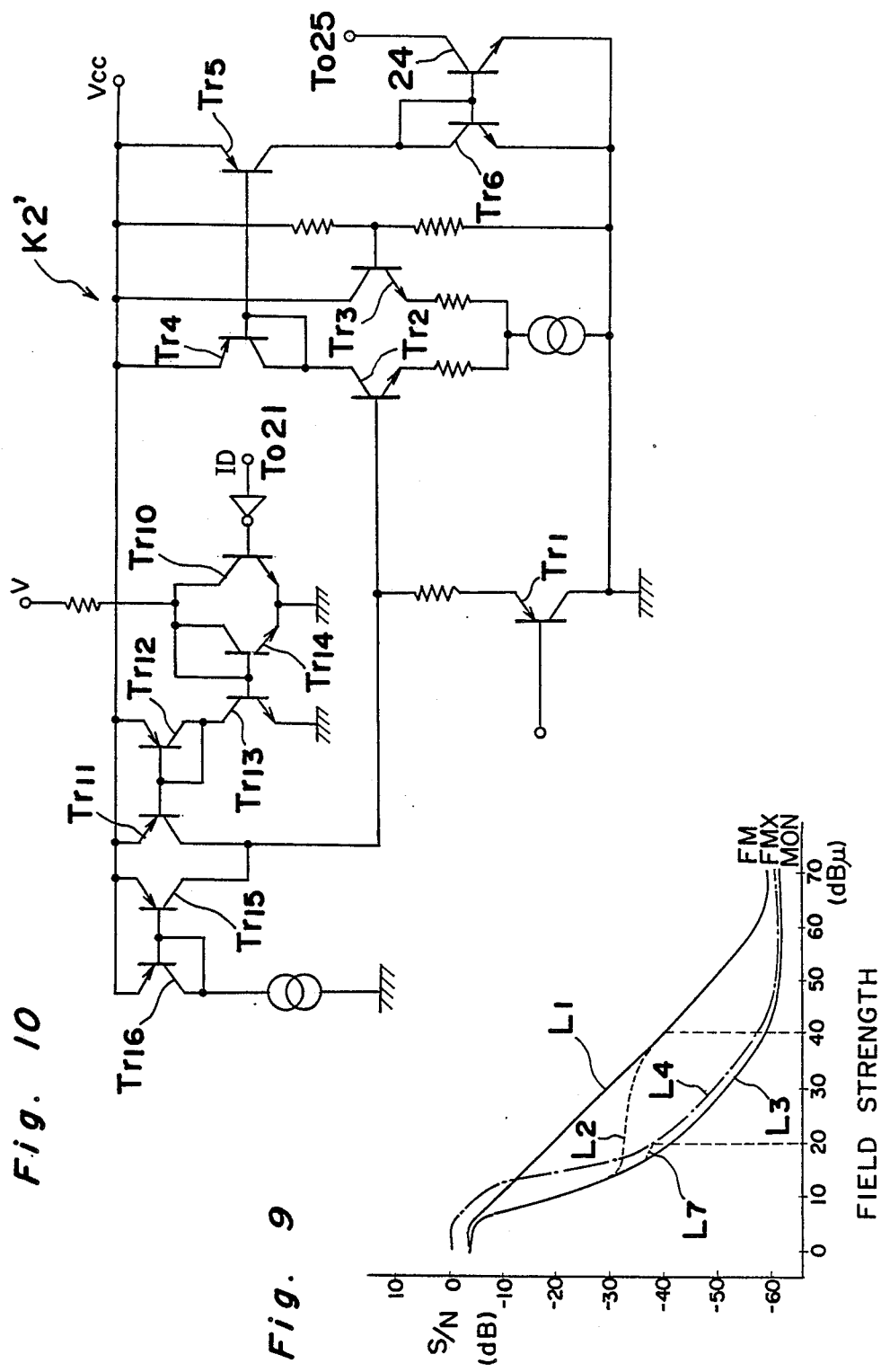
FIG. 9 is a graph similar to that shown in FIG. 5, but particularly showing a mode change effected by the circuit of FIG. 7.
FIG. 10 is detailed circuit diagram of a portion enclosed by a dotted line in FIG. 7.

Referring to FIG. 9, a graph similar to that shown in FIG. 5 is shown. The difference is such that a dotted line L7 is added to show that during the FMX stereophonic signal receiving, the stereophonic mode is automatically and continuously changed to monaural mode when the receiving FMX stereophonic signal becomes relatively weak, such as below 20 dB. This level is lower than the level at which the stereophonic mode is automatically changed to the monaural mode under the FM stereophonic signal receiving. This is accomplished by the circuit of FIG. 7 in which resistor 28 is selectively grounded or ungrounded depending on the FM stereophonic signal receiving or FMX stereophonic signal receiving. Thus, the signal-to-noise ratio is improved also during the FMX stereophonic signal receiving.

Note that while in the embodiment of the present invention shown in FIG. 7 an operation start level control circuit is composed of potential resistors 27 and 28 inserted between smoothing circuit 23 and output transistor 24, the present invention may also be composed so as to switch the operation start level of control circuit 25 itself. For example, when control circuit 25 is constructed using a differential amplifier, it may be so constructed as to switch the reference voltage. Furthermore, while in a preferred embodiment, stereophonic separation is controlled by controlling the demodulation efficiency of synchronous detector 17, the present invention also applies to other separation control methods, including mixing left and right stereophonic signals L and R applied to left and right output terminals 30 and 30'. Moreover, in a preferred embodiment, FMX stereophonic signal receiving is determined by detecting the presence of an ID signal, but the aforementioned determination can also be accomplished by detecting the output level of quadrature detector 18.

Referring to FIG. 10, a circuit K2' is shown which can be replaced with a circuit K2 enclosed in a dotted line in FIG. 7.

During the receiving of FM stereophonic signal, transistor Tr10 is turned on by the low level signal produced from ID detector 21. Thus, transistors Tr11–Tr14 defining a second current source turn off. The first current source is defined by transistors Tr15 and Tr16. Therefore, when transistor Tr1 turns on, the base of transistor Tr2 rapidly decreases to a low level. The operation after transistor Tr2 is the same as that described above in connection with FIG. 6.

During the receiving of FMX stereophonic signal, transistor Tr10 is turned off by the high level signal produced from ID detector 21. Thus, transistors Tr11–Tr14 defining the second current source turn on. Thus, by the first and second current sources, the base of transistor Tr2 gradually decreases to a low level in response to the turn on of transistor Tr1.

According to a second embodiment of the present invention, an FM/FMX stereophonic receiver which is able to receive both FM and FMX stereophonic signals with a good signal-to-noise ratio can be provided. In particular, because the level at which stereophonic separation control starts differs during FM and FMX stereophonic broadcast receiving, receiving of FMX stereophonic broadcasts with a good signal-to-noise ratio and good stereophonic separation can be achieved.

Figure 11:
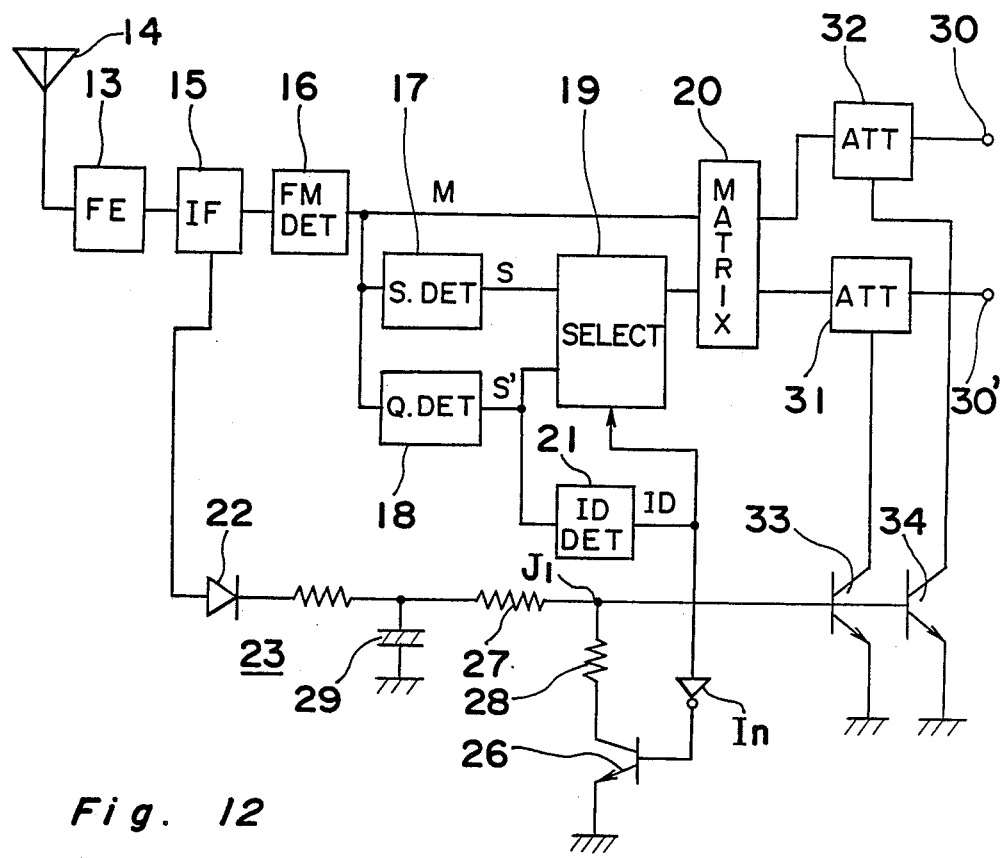
FIG. 11 is a circuit diagram of an FM/FMX stereophonic receiver according to a third embodiment of the present invention.

Referring to FIG. 11, a third embodiment of the present invention is shown. When compared with the second embodiment shown in FIG. 7, instead of output transistor 24, the third embodiment has transistors 33 and 34 which have bases thereof connected to a junction J1 between resistors 27 and 28. The collectors of transistors 33 and 34 are connected, respectively, to attenuators 31 and 32. Attenuators 31 and 32 are connected to the left and right signal outputs of a matrix circuit, respectively, so as to attenuate the high frequency regions of the left and right signals simultaneously.

In operation, when an FM stereophonic broadcast signal is received, the 10-Hz ID signal is not present. Thus, ID detector 21 produces a low level signal which is applied to selector 19, and selector 19 thus selects uncompressed stereophonic difference signal S which is applied to matrix circuit 20. As a result, uncompressed stereophonic difference signal S obtained from selector 19 and stereophonic sum signal M, which is contained in the stereophonic composite signal, are matrixed by matrix circuit 20, and left and right stereophonic signals L and R are thereby applied to left and right output terminals 30 and 30', respectively.

Figure 12:
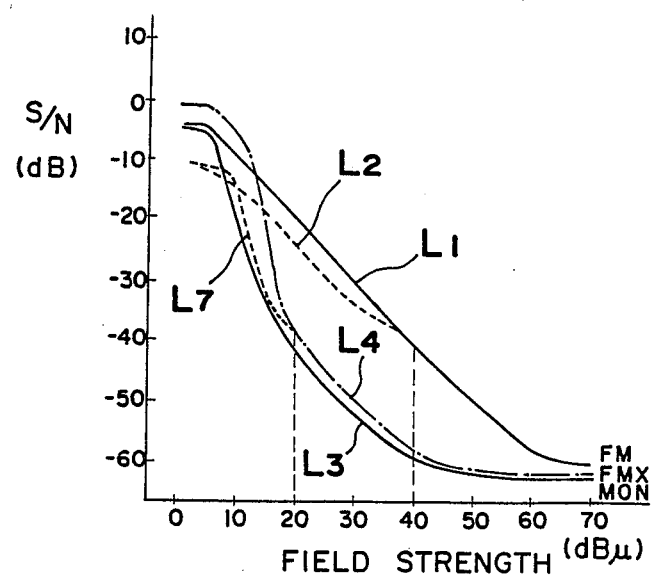
FIG. 12 is a graph similar to that shown in FIG. 5, by particularly showing a mode change effected by the circuit of FIG. 11.

The low level signal from ID detector 21 is also applied through inverter In to transistor 26 which is thereupon turned on. Thus, resistor 28 is connected between junction J1 and ground to divide the voltage transmitted from smoothing circuit 23. Accordingly, the voltage across capacitor 29 is divided by resistors 27 and 28, and the divided voltage as produced at junction J1 is applied to the base of output transistors 33 and 34. Therefore, with respect to the change of FM stereophonic signal between weak and strong within a certain range, the voltage at junction J1 applied to the base of transistors 33 and 34 varies within a relatively narrow range G1, as described above in connection with FIG. 8. Thus, during the FM stereophonic signal receiving, the conductivity, i.e., the collector current $I_C$, of transistors 33 and 34 starts to be reduced when the FM stereophonic signal is reduced from a relatively high level, such as 40 dB. When the conductivity of transistors 33 and 34 are reduced the collector current of transistors 33 and 34 decreases, and attenuators 31 and 32 begin to attenuate the signal passing therethrough from matrix 20 to output terminals 30 and 30'. As the field strength of the received signal decreases even further, the collector current of transistors 33 and 34 is further reduced, so that attenuators 31 and 32 operate to attenuate the signal even more. Thus, the annoying high frequency noise component decreases, and as a result an improvement in the signal-to-noise ratio is achieved, as indicated by a dotted line L2 shown in FIG. 12.

When an FMX stereophonic signal is received, ID detector 21 produces a high level signal so that selector 19 selects signal (S+S') and switching transistor 26 turns off. Accordingly, the voltage across capacitor 29 is applied through resistor 27 to the base of transistor 24 without being divided. Therefore, with respect to the change of FMX stereophonic signal between weak and strong in the same range as that of the FM stereophonic signal, the voltage at junction J1 applied to the base of transistors 33 and 34 varies within a relatively wide range G2, as described above in connection with FIG. 8. Thus, during the FMX stereophonic signal receiving, the conductivity of transistors 33 and 34 starts to be reduced not until the FMX stereophonic signal is reduced to a relatively weak level, such as 20 dB. The conductivity reduction of transistors 33 and 34 will result in the same manner as described above. Thus, the improvement in the signal-to-noise ratio is achieved, as indicated by a dotted line L7 shown in FIG. 12.

Note that, during the FMX stereophonic signal receiving, the conductivity reduction of transistors 33 and 34 will start not until the field strength of the FMX stereophonic signal is reduced to a relatively low level, such as 20 dB, whereas during the FM stereophonic signal receiving, the conductivity reduction of transistors 33 and 34 will start from a point when the FM stereophonic signal is reduced to a relatively high level, such as 40 dB.

Also, note that while in the embodiment of the present invention shown in FIG. 11 only high frequency attenuation control is discussed as a means of improving the signal-to-noise ratio, the level at which high frequency attenuation begins can be appropriately varied when high frequency attenuation is combined with other methods of signal-to-noise ratio improvement, such as with stereophonic separation control.

According to a third embodiment of the present invention as discussed above, an FMX stereophonic receiver which is able to receive both FM and FMX stereophonic signals with a good signal-to-noise ratio can be provided. In particular, because the level at which high frequency attenuation starts differs during FM and FMX-stereophonic broadcast receiving, receiving of FMX stereophonic broadcasts with a good signal-to-noise ratio and good frequency response characteristics can be achieved.

Although the present invention has been fully described with reference to preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. An FM/FMX stereophonic receiver for receiving an FMX stereophonic broadcast signal which includes a stereo sum signal, a stereo difference signal, a compressed stereo difference signal and an FMX ID signal indicating the FMX stereophonic broadcast signal, and also for receiving an FM stereophonic broadcast signal which includes a stereo sum signal and stereo difference signal, said FM/FMX stereophonic receiver comprising:
   a stereo demodulation circuit means for receiving a broadcast signal, which may be either of said FM or FMX stero broad st signals, and for producing left and right stereo signals;
   means for detecting the field strength of the received broadcast signal;
   means for reducing noise signals contained in said left and right stereo signals;
   means for detecting said FMX ID signal;
   means for disabling said reducing means when said FMX ID signal is detected by said detecting means.

2. An FM/FMX stereophonic receiver for receiving an FMX stereophonic broadcast signal which includes a stereo sum signal, a stereo difference signal, a compressed stereo difference signal and an FMX ID signal indicating the FMX stereophonic broadcast signal, and also for receiving an FM stereophonic broadcast signal which includes a stereo sum signal and stereo difference signal, said FM/FMX stereophonic receiver comprising:
   a stereo demodulation circuit means for receiving a broadcast signal, which may be either of said FM or FMX stero broad st signals, and for producing left and right stereo signals;
   means for detecting the field strength of the received broadcast signal;
   means for detecting said FMX ID signal;
   means, during the absence of said FMX ID signal, for producing a control signal when the detected field strength becomes lower than a predetermined level, and during the presence of said FMX ID signal, for producing no control signal;
   means for controlling said stereo demodulation circuit means to reduce the demodulation efficiency when said control signal is produced.

3. An FM/FMX stereophonic receiver for receiving an FMX stereophonic broadcast signal which includes a stereo sum signal, a stereo difference signal, a compressed stereo difference signal and an FMX ID signal indicating the FMX stereophonic broadcast signal, and also for receiving an FM stereophonic broadcast signal which includes a stereo sum signal and stereo difference signal, said FM/FMX stereophonic receiver comprising:
   a stereo demodulation circuit means for receiving a broadcast signal, which may be either of said FM or FMX stereo broad st signals, and for producing left and right stereo signals;
   means for detecting the field strength of the received broadcast signal;
   means for reducing noise signals contained in said left and right stero signals;
   means for detecting said FMX ID signal;
   means, during the absence of said FMX ID signal, reducing means start to activate in response to the detection of said FMX ID signal.

4. An FM/FMX stereophonic receiver as claimed in claim 3, wherein said reducing means reduces said noise signals by the change of said stereo demodulation circuit means from a stero mode to a monaural mode smoothly.

5. An FM/FMX stereophonic receiver as claimed in claim 3, wherein said stero demodulation circuit means comprises a synchronous detector for said stero difference signal.

6. An FM/FMX stereophonic receiver as claimed in claim 5, wherein said reducing means comprises a level control means for controlling a level of a 38 kHz signal to be applied to said synchronous detector.

7. An FM/FMX stereophonic receiver for receiving an FMX stereophonic broadcast signal which includes a stereo sum signal, a stereo difference signal, a compressed stereo difference signal and an FMX ID signal indicating the FMX stereophonic broadcast signal, and also for receiving an FM stereophonic broadcast signal which includes a stereo sum signal and stereo difference signal, said FM/FMX stereophonic receiver comprising:
   a stereo demodulation circuit means for receiving a broadcast signal, which may be either of said FM or FMX stero broad st signals, stereo signals;
   means for detecting the field strength of the received broadcast;
   means for detecting said FMX ID signal;
   means, during the presence of said FMX ID signal, for producing a control signal when the detected field strength becomes lower than a predetermined level, and during the absence of said FMX ID signal, for producing said control signal when the detected field strength becomes lower than a second predetermined level, said second predetermined level being higher than said first predetermined level;
   means for controlling said stereo demodulation circuit means to reduce the demodulation efficiency when said control signal is produced.

8. An FM/FMX stereophonic receiver as claimed in claim 7, wherein said control means controls said stereo demodulation circuit means to change from a stero mode to a monaural mode smoothly when said control signal is produced.

9. An FM/FMX stereophonic receiver as claimed in claim 7, wherein said stero demodulation circuit means comprises a synchronous detector for detecting said stereo difference signal.

10. An FM/FMX stereophonic receiver as claimed in claim 9, wherein said control means comprises a level control means for controlling a level of a 38 kHz signal to be applied to said synchronous detector.

11. An FM/FMX stereophonic receiver as claimed in claim 7, wherein said control signal producing means comprises a voltage divider which is activated during the absence of said FMX ID signal.

12. An FM/FMX stereophonic receiver as claimed in claim 7, wherein said control signal producing means comprises:

a first transistor for receiving at its base a signal representing the field strength signal of the received broadcast signal;

first current source and second current source for supplying current to said first transistor; and current interruption means for interrupting the current from said second current source during the presence of said FMX ID signal.

13. An FM/FMX stereophonic receiver for receiving an FMX stereophonic broadcast signal which includes a stereo sum signal, a stereo difference signal, a compressed stereo difference signal and an FMX ID signal indicating the FMX stereophonic broadcast signal, and also for receiving an FM stereophonic broadcast signal which includes a stereo sum signal and stereo difference signal, said FM/FMX stereophonic receiver comprising:

a stereo demodulation circuit means for receiving a broadcast signal, which may be either of said FM or FMX stereo broad st signals, and for producing left and right stereo signals;

means for detecting the field strength of the received broadcast signal;

means for detecting said FMX ID signal;

means, during the presence of said FMX ID signal, for producing a control signal when the detected field strength becomes lower than a first predetermined level, and during the absence of said FMX ID signal, for producing said control signal when the detected field strength becomes lower than a second predetermined level, said second predetermined level being higher than said first predetermined level;

means for controlling said stereo demodulation circuit means to continuously reduce the level of said left and right stereo signals when said control signal is produced.

14. An FM/FMX stereophonic receiver as claimed in claim 10, wherein said controlling means comprises attenuators for the left and right stereo signals for cutting high frequency region signals.

* * * * *